United States Patent [19]

Campanella et al.

[11] 4,231,511
[45] Nov. 4, 1980

[54] WAITER/TABLE CONTROL FOR ELECTRONIC CASH REGISTERS

[75] Inventors: Matthew J. Campanella, Hammonton; Anthony Maladra, Cherry Hill; Bennett C. Goldberg, Cinnaminson, all of N.J.

[73] Assignee: MKD Corporation, Cherry Hill, N.J.

[21] Appl. No.: 30,760

[22] Filed: Apr. 17, 1979

[51] Int. Cl.³ .................... G06F 15/20; G06K 15/02; G06K 21/00
[52] U.S. Cl. .................................. 235/375; 235/419; 235/487
[58] Field of Search ............... 235/375, 419, 432, 487, 235/494; 340/149 A

[56] References Cited

U.S. PATENT DOCUMENTS

| | | | |
|---|---|---|---|
| 3,678,250 | 7/1972 | Dethloff et al. | 340/149 A |
| 3,688,269 | 8/1972 | Miller | 340/149 A |
| 3,733,862 | 5/1973 | Killmeyer | 340/149 A |
| 3,761,892 | 9/1973 | Bosnyak et al. | 340/149 A |
| 3,821,704 | 6/1974 | Sabsay | 340/149 A |
| 3,961,747 | 6/1976 | Small et al. | 235/489 |

*Primary Examiner*—Daryl W. Cook
*Attorney, Agent, or Firm*—Duffield & Lehrer

[57] ABSTRACT

A waiter/table control module adapted for data input to an ECR which identifies the waiter operating the cash register by means of a key like device which cooperates with an electronic device to generate a binary expression representing the waiter to whom the key is assigned and further identifies the tables against which the sale is to be recorded by means of a keyboard matrix having a key for each table and a light within the key.

15 Claims, 3 Drawing Figures

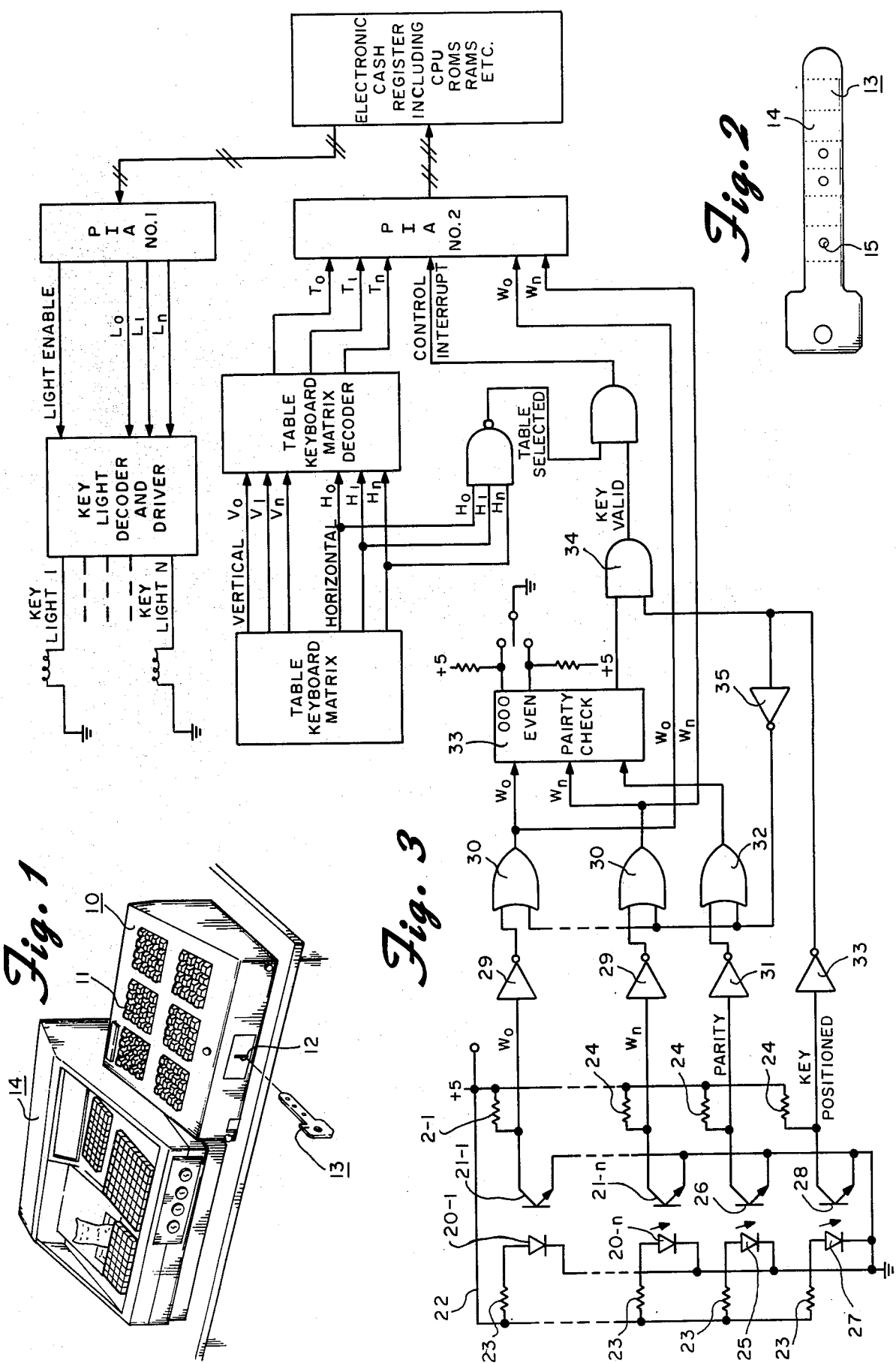

WAITER/TABLE CONTROL FOR ELECTRONIC CASH REGISTERS

BACKGROUND OF INVENTION

The present invention relates to improvements in electronic cash registers and, more specifically, to improvements in electronic cash registers of the type employed in restaurants and the like wherein the patron checks are divided and categorized by particular waiters and tables.

In a commercial establishment such as a restaurant and/or bar, there are usually a large number of waiters or operators of the cash register. Additionally, it is desirable to maintain a separate total or identification of a check by waiter and also by the particular table or patron being served.

Maintaining totals by each waiter provides a quick and accurate way of determining the exact amount of receipts which that particular waiter would be accountable for. Additionally, maintaining separate totals for each table and/or patron while the patron is in the establishment also provides a means to accurately and quickly print out the patrons check at the time the bill is closed.

There currently exists cash registers which have the capability of maintaining separate waiter totals and table totals. However, in these registers the waiter identification is made by the waiter entering his assigned number upon the keyboard. The table identification is likewise entered into the register by means of the standard numeric keyboard of the cash register.

A system of this nature is very susceptible to an error in the entry of the waiter number. Additionally, a dishonest waiter can very easily enter the number of another waiter into the register and collect the receipts and retain them himself thus breaching the entire security of the system.

Electronic cash registers of the foregoing type also are susceptible to error in entry of the table number on the standard keyboard. Once the table number is entered, there is no physical representation of the table number which remains to confirm to the operator that the right table number has been entered.

OBJECTS AND SUMMARY OF INVENTION

It is an object of the present invention to provide improvements to electronic cash registers which will provide positive and foolproof identification of a given waiter preparing to operate the cash register.

It is a further object of the present invention to provide improvements to electronic cash registers which provides a quick, accurate and easily identifiable means of entering the table number to which the transaction is to be credited.

The foregoing objects are carried out by the present invention by means of a waiter/table control module which provides data input to the electronic cash register in the form of waiter identification and table identification.

Waiter identification is accomplished in the waiter/control module of the present invention by means of a first electronic device which operates in conjunction with a plurality of key like devices. The keys differ one from another in their encoding and are assigned to given waiters. The key like devices include open and closed segments and cooperate in conjunction with a plurality of photoelectric devices positioned within the control module. Whenever the key like device is inserted into the control module, the photosensitive devices generate a binary expression representing the particular waiter to which the key has been assigned. The binary expression is one input to the electronic cash register to provide foolproof positive identification of the particular waiter/operator.

The waiter/table control module further includes a plurality of discrete keys, one for each table or patron for which a guest check is to be maintained. The keys are arranged in the familiar keyboard matrix format and further include lights within the keys. Depressing a given key assigned to a given table will create a binary expression representing the particular table number. The binary expression becomes the input to the electronic cash register providing the table identification. The light within the keyboard assigned to that particular key is then lit to provide visual confirmation to the operator that the proper key-table has been depressed.

Further objects and advantages of the present invention will be realized from the detailed description thereof which follows taken in conjunction with the drawing.

DESCRIPTION OF DRAWING

FIG. 1 is a perspective view of the waiter/table control module of the present invention shown in conjunction with an electronic cash register;

FIG. 2 is a side elevational view of the key like device used in conjunction with the present invention; and FIG. 3 is a schematic diagram of the waiter/table control module.

DETAILED DESCRIPTION OF INVENTION

The waiter/table control module 10 of the present invention is shown in FIG. 1 of the drawing. The module includes a plurality of keypads 11. In the particular embodiment shown, each keypad includes sixteen keys whereas there are six keypads providing a total of ninety-six separate keys. Each key will be assigned a number indicating either a patron or a given table.

The waiter/table control module 10 further includes a waiter identification system 12 which operates in conjunction with a key like device 13 to be described in more detail hereinafter. In accordance with the present invention, the key like device 13 is inserted into the waiter identification system 12 to provide a positive identification of the particular waiter and also to enable operation of the cash register 14 into which the waiter/table control module 10 is connected.

The key like device 13 is shown in more detail in FIG. 2. Each key like device 30 or waiter key is formed of a metallic material such as brass. The key includes an elongate uniform cross section shaft 14.

The key shaft 14 is divided into seven segments along the length of the shaft. These segments are selectively left blank or may include holes or apertures 15 therein. The absence or presence of an aperture cooperates in conjunction with photosensitive devices, as to be described in more detail hereinafter, to generate binary expressions used to identify a given waiter.

The first five segments of the waiter key, counting from the head end of the key, are used for waiter identification thus providing for a combination of thirty-one aperture/blank combinations to identify thirty-one waiters. The sixth segment is used selectively with either an aperture or blank to provide a parity check.

Lastly, the seventh segment is used to provide a key in position signal as will be further described hereinafter.

The schematics of the waiter/table control module 10 are shown in FIG. 3 of the drawing. The waiter identification system 12 includes a plurality of light emitting diodes 20-1 through 20-n. Cooperating with the light emitting diodes are a like plurality of photosensitive transistors 21-1 through 21-n positioned in light communication with the light emitting diodes to form LED-phototransistor pairs.

Each light emitting diode is energized by means of a bus line 22 and a current limiting resistor 23. In a like manner, bus line 22 through current limiting resistors 24 supplies the current for the operation of the phototransistors.

A light emitting diode 25 and associated phototransistor 26 provide a LED-phototransistor pair to provide a parity check signal as will be described hereinafter. Lastly, a further light emitting diode 27 and associated phototransistor 28 provide a LED-phototransistor pair to provide a key positioned signal as will be further described hereinafter. These latter two LED-phototransistor pairs are energized as in the case of the previously described pairs.

The LED-phototransistor pairs are positioned within the waiter identification system 12 such that, when the key 14 is inserted it will pass between the light emitting diode and the phototransistor and the end of the key will strike a stop. At this position, the encoded segments of the key are positioned in alignment with the LED-phototransistor pairs. In this manner, those segments having apertures therein will permit light to pass from the LED to the phototransistor whereas those not having apertures therein will block the light from the LED thus creating either on or off conducting states of the phototransistors to thus create binary signals.

The output of the phototransistors 21-1 through 21-n, which represent the waiter identification binary signals $W_O$-$W_n$ are applied to buffer and inverters 29. The output from the buffer and inverters 29 are applied to OR gates 30.

Light emitting diode 25 and phototransistor 26 provide an LED-phototransistor pair which cooperates with the next to last encoded segment of the waiter key to provide a parity check signal. The output of the phototransistor pair is applied to a buffer and inverter 31 whose output is, in turn, applied as one of the inputs to an OR gate 32. The output of OR gate 32 is applied to a parity check semiconductor device 33 as the parity check input thereto.

Light emitting diode 27 and its companion phototransistor 28 provide a LED-phototransistor pair which reads the last encoded segment of the waiter key to provide a key positioned signal. In the embodiment shown in FIG. 3, the final segment on the waiter key is a blank and thus, when the waiter key is fully inserted into the keyway, the light from the light emitting diode 27 will be blocked from phototransistor 28 resulting in the output of the transistor going high when the key is in final position. This high signal is applied across a buffer 33 and provides one of the inputs to an AND gate 34.

The output from buffer 33 is also applied to a further buffer and inverter 35. The output from inverter and buffer 35, which is consequently low upon the presence of a waiter key in place, provides a low input to OR gates 30 thus enabling OR gates 30 to pass any high signals $W_O$-$W_n$ through the OR gates 30 and to the parity check device 33. Likewise, the binary expression passing from OR gates 30 as signals $W_O$-$W_n$ are now applied to a peripheral interface adapter #2.

The output from buffer and inverter 35 also provides a low and enabling signal to OR gate 32. In this manner, the parity check signal from the buffer and inverter 31, whether selected as high or low, is applied to the parity check device 33.

The parity check device 33, once the key is in position, now has all of the waiter identification binary expression $W_O$-$W_n$ applied to it as well as the parity check signal. If parity check is accomplished in the parity check device 33, then the appropriate parity recognition signal is generated and applied as a high to AND gate 34 thus enabling AND gate 34 in conjunction with the key positioned signal also applied thereto from the buffer 33. The presence of two high inputs to the AND gate 34 then generates a key valid signal which is applied to a further AND gate 36 for the purpose to be hereinafter described.

Parity check device 33 includes two inputs thereto which, by means of toggle switch 37, may change the parity check from odd to even and vice versa. By means of this technique, two control modules may be operated within the same establishment and the parity check for one set at odd while the other is set at even. This will prevent waiters with even parity keys from utilizing the waiter/table control module which has been set for the odd parity check. In this manner, further security is provided and the total number of waiters capable of utilizing the equipment is doubled.

After the waiter has inserted his waiter key, the waiter then will press one of the table buttons in the waiter/table control module. The keyboard pads 11 are wired into a table keyboard matrix 38. The table keyboard matrix 38 will provide vertical line signals $V_O$-$V_n$ and horizontal line signals $H_O$-$H_n$ in the normal heretofore known keyboard matrix format.

Signals $V_O$-$V_n$ and $H_O$-$H_n$ are applied to a table keyboard matrix decoder 39. The table keyboard matrix decoder 39 decodes the signals upon the vertical and horizontal lines from the keyboard matrix 38 and generates a binary expression $T_O$-$T_n$ representing the table number of the key depressed upon the table keyboard matrix. Signals $T_O$-$T_n$ are applied to peripheral interface adapter #2 together with the waiter identification binary expression $W_O$-$W_n$.

The horizontal output lines $H_O$-$H_n$ of the table keyboard matrix are interconnected to a NAND 40. The keys of the keyboard matrix 38 are of the type that are normally high and go to ground or zero when depressed. Accordingly, the output of NAND gate 40 is normally low until a key is struck. Upon the striking of a key of the keyboard matrix, the output of NAND gate 40 goes high.

The output from NAND gate 40 is applied as the second input to AND gate 36. At this point in the progress of the transaction, the inputs to AND gate 36 are both high, i.e. a table selected signal appearing from NAND gate 40 and a key valid signal being applied from AND gate 34. Upon the occurrence of both high signals, AND gate 36 produces a high signal which is a control interrupt signal and which is applied to peripheral interface adapter #2.

Peripheral interface adapter #2 is interconnected by a bus line 41 to the electronic cash register 14. Peripheral interface adapter #2, upon the appearance of the control interrupt signal, passes the interrupt signal to the central processing unit of the electronic cash register. The appearance of the control interrupt signal at the CPU of the ECR will initiate a subroutine in the ECR which will then look to the peripheral interface adapter #2 for the waiter identification binary expression ($W_O$–$W_n$) and also the table identification binary expression ($T_O$–$T_n$). At this point, depending upon the programming of the CPU, the waiter identification is stored and the table identification is utilized to retrieve from memory any prior balance associated with that particular table. The prior balance is stored.

The subroutine of the CPU, upon recognition of receipt of the waiter binary expression and the table binary expression, applies a series of signals upon bus line 42 to peripheral interface adapter #1 representing the key number of the key depressed on the table keyboard matrix 38. Peripheral interface adapter #1 generates a binary expression $L_O$–$L_n$ representing the keyboard key depressed to a key light decoder and driver device 43 of heretofore known configuration. Peripheral interface adapter #1 also, under the control of the CPU, provides a light enable signal from the peripheral interface adapter #1 to the key light decoder and driver 43 to enable the key light decoder and driver 43.

Each key of the keyboard matrix includes a lamp 44 within the key which, when illuminated, is visually apparent through the surface of the key. The key light decoder and driver has an output line for each key of the keyboard matrix and is wired from the key light decoder and driver through the lamp to ground.

Upon the appearance of the light enable signal from the peripheral interface adapter #1, the key light decoder and driver is enabled and an energizing signal will appear upon the particular line wired to the particular keyboard key as decoded by the key light decoder and driver. The subsequent lighting of the key and its visual observation by the waiter is visual confirmation that the proper table key has been chosen as well as confirmation that the ECR has received the proper waiter identification and table identification.

At this point in the data processing, the CPU returns to its normal routine, i.e. waiting for data entry from the ECR keyboard. At this point, the waiter will then enter the normal data such as menu items, bar items and the like. The program of the ECR is such that these items will then be added to the previous balance placed in storage and the table number and waiter number imprinted upon the guest check or register receipt.

If the particular patron's table check is not to be closed out at this time, the waiter will then depress the appropriate key on the cash register and the new table balance will be rewritten to a memory location assigned to that table as well as the waiter's total for all tables assigned to that particular waiter will likewise be complemented and rewritten to a memory block associated with that particular waiter. At that time, the program of the register will provide a signal to the peripheral interface adapter #1 removing the signals $L_O$–$L_n$ from the key light decoder and driver thus extinguishing the key lamp. At this point the waiter will remove his waiter key and the system is reset for the next transaction.

In a preferred embodiment of the invention, the program in the cash register may be set such that a second control interrupt signal appearing at the peripheral interface adapter #2 will be passed to the CPU and will function to provide complementing and storage and return of the complemented figures to the memory block for the particular table involved as well as for the waiter involved. This second control interrupt signal can be generated simply by depressing for a second time the key assigned to the table for which the transaction is being entered. Depressing the key a second time will again create an output signal from NAND gate 40 which will be passed through AND gate 36 as a second control interrupt signal appearing at the peripheral interface adapter #2.

In the event that the particular table being served requires their totalized check, then the appropriate total key is depressed on the electronic cash register. The program in the electronic cash register will operate in the heretofore known manner and will rewrite the complemented storage items back to the memory and then completely read the memory block for that particular table and print out upon the guest check and/or register receipt all items which have theretofore been ordered and which are carried in the memory as separate items together with the appropriate subtotal and totals of these items. At that point the memory for the particular table has been cleared. Additionally, the waiter total is further complemented by the total amount for the particular table being cleared.

The electronic cash register, as in the prior transaction wherein no total was taken, will communicate with the peripheral interface adapter #1 and extinguish the light within the key. The waiter will also then remove his waiter key following the total transaction and the register is again returned to condition for receipt of further transactions.

The improvements to electronic cash registers in accordance with the present invention have been described in respect to the particular embodiment thereof described in the foregoing specification and shown in the drawing. In view of the foregoing, other modifications and alterations to the invention will now become apparent to those skilled in the art. Therefore, no limitation as to the scope of the invention was intended by the particular embodiment thereof described in the specification and shown in the drawing but the same is to be interpreted in view of the claims.

We claim:

1. In electronic cash registers of the type used in restaurants and the like and providing for data input to the electronic cash register such as waiter identification and table number, the improvements in the mode of waiter/table identification comprising:
   a plurality of security devices differing one from another and assigned to and carried by a given waiter; and
   first electronic means interconnected to the electronic cash register and operable by each different security device for generating a first electronic signal identifiable with a given security device to provide waiter identification.

2. The electronic cash register of claim 1 wherein the security devices are key like devices.

3. The electronic cash register of claim 2 wherein the first electronic means includes a plurality of photosensitive electronic devices and wherein the key like devices each include prearranged open and closed encoded segments cooperating with the photosensitive electronic devices to generate a binary expression representing the number assigned to each given key.

4. The electronic cash register of claim 3 wherein one segment of the key like device provides a parity check signal.

5. The electronic cash register of claim 3 wherein one segment of the key like device provides a key position signal indicating the key like device is properly positioned in respect to the photosensitive electronic devices.

6. The electronic cash register of claim 5 wherein the binary expression is applied to a gating device and the key position signal enables the gating device to prevent false binary expressions being transmitted until the key like device is properly positioned.

7. The electronic cash register of claim 1 further including second electronic means for generating a second electronic signal identified with and assigned to a given subject such as a table number.

8. The electronic cash register of claim 7 wherein the second electronic means is a keyboard matrix presenting a table key for each table.

9. The electronic cash register of claim 8 wherein each key includes a lamp therein and further including third electronic means under the control of the electronic cash register for lighting the lamp of the key identified by the second electronic signal during a register transaction.

10. The electronic cash register of claim 3 further including second electronic means for generating a second electronic signal identified with and assigned to a given subject such as a table number.

11. The electronic cash register of claim 10 wherein one segment of the key like device provides a parity check signal and further including a parity reading device to which the binary expression and parity check signal are applied and which generates a parity output signal upon parity recognition.

12. The electronic cash register of claim 11 wherein one segment of the key like device provides a key position signal indicating the key like device is properly positioned in respect to the photosensitive electronic devices.

13. The electronic cash register of claim 12 wherein the parity output signal and key position signal are applied to an AND gate to provide a waiter key valid signal.

14. The electronic cash register of claim 13 further including a key strike recognition device responsive to the second electronic means for generating a table selected signal.

15. The electronic cash register of claim 14 wherein the waiter key valid signal and the table selected signal are applied to an AND gate to generate a control interrupt signal to be applied to the electronic cash register to initiate data processing.

* * * * *